United States Patent [19]
Mattas et al.

[11] Patent Number: 5,410,221
[45] Date of Patent: Apr. 25, 1995

[54] LAMP BALLAST WITH FREQUENCY MODULATED LAMP FREQUENCY

[75] Inventors: Charles B. Mattas, Glenview, Ill.; Jos R. Bergervoet, Eindhoven, Netherlands

[73] Assignee: Philips Electronics North America Corporation, New York, N.Y.

[21] Appl. No.: 52,312

[22] Filed: Apr. 23, 1993

[51] Int. Cl.⁶ .............................................. G05F 1/00
[52] U.S. Cl. .................... 315/307; 315/308; 315/291; 315/209 R; 315/247; 315/DIG. 5; 315/DIG. 7
[58] Field of Search .................. 315/209 R, 291, 307, 315/308, 194, DIG. 7, DIG. 5, 247

[56] References Cited

U.S. PATENT DOCUMENTS

| | | | |
|---|---|---|---|
| 3,611,021 | 10/1971 | Wallace | 315/239 |
| 4,277,728 | 7/1981 | Stevens | 315/307 |
| 4,471,269 | 9/1984 | Ganser et al. | 315/307 |
| 4,782,268 | 11/1988 | Fahnrich et al. | 315/200 |
| 4,862,040 | 8/1989 | Nilssen | 315/244 |
| 4,873,471 | 10/1989 | Dean et al. | 315/308 |
| 5,001,400 | 3/1991 | Nilssen | 315/209 |

FOREIGN PATENT DOCUMENTS

9204808 3/1992 WIPO.

*Primary Examiner*—Robert J. Pascal
*Assistant Examiner*—Reginald A. Ratliff
*Attorney, Agent, or Firm*—David R. Treacy

[57] ABSTRACT

An electronic high frequency supply, such as a lamp ballast, having a full-wave rectifier, a storage capacitor charged to a voltage greater than the peak of the rectifier output, and an isolating diode between the rectifier and the diode. An inverter is connected to the energy storage capacitor, and has a high frequency inductive load circuit connected between the inverter output and a junction between the isolating diode and the storage capacitor. A capacitor, connected to the junction in parallel with a series circuit formed by the isolating diode and storage capacitor, forms a high frequency resonance circuit with the inductive load circuit. Current is drawn from the rectifier only as a series of pulses at the inverter frequency. To minimize variation in the high frequency load current, the inverter frequency is varied according to a sensed parameter which varies during each cycle of the rectifier output.

33 Claims, 5 Drawing Sheets

LAMP BALLAST WITH FREQUENCY MODULATED LAMP FREQUENCY

CROSS-REFERENCE TO RELATED APPLICATIONS

This application is related to the subject matter of concurrently-filed application Ser. No. 08/052311, filed by Adan F. Hernandez and Gert W. Bruning for LAMP BALLAST WITH FREQUENCY MODULATED LAMP FREQUENCY BASED ON INPUT LINE VOLTAGE.

BACKGROUND OF THE INVENTION

1. Field of the Invention

The invention relates to electronic lamp ballasts which have been developed to meet the need for higher efficiency electric lighting with arc discharge lamps, and in particular for fluorescent lamps. Continuing development has caused much of the emphasis to shift from a simple "lumens per watt" approach to increasingly tight specification of other parameters. In particular, power companies desire improvement of power factor, including reduction of line current distortion (harmonics), and proposed standards require improved lamp current crest factor.

2. Description of the Prior Art

Electronic ballasts in common use all include a high frequency inverter, operated at a frequency high enough to minimize component size and improve lamp performance, yet not so high that radio noise becomes serious. Those intended for operation from a commercial AC power line usually include a full-wave rectifier, an energy storage capacitor from which the inverter is supplied, and a resonance circuit for connecting the lamps to the inverter. The earlier ballasts of this type had an electrolytic capacitor connected directly across the output of a full-wave bridge rectifier, which supplied 120 relatively short current pulses per second to the capacitor. As a result the line current had a very large harmonic current content. At the same time, the voltage across the energy storage capacitor had a relatively large ripple voltage which caused the amplitude of the high frequency lamp current to vary excessively, with a crest factor greater than 1.7.

In ballasts of this type the inverter frequency is usually not tightly controlled; commonly the inverter is "self-triggering" so that the frequency is relatively constant at a value around 30 kHz. To reduce the harmonic currents drawn from the power line, and improve the lamp crest factor, various DC boost circuits have been proposed, which involve taking high frequency power from the inverter, rectifying it and storing it, to help supply the inverter at least during periods of the input power line half cycle when the voltage is relatively low. These circuits have had the common property of being relatively complex and costly; for example, they often require a separate transformer winding, rectifier diodes, and an additional electrolytic capacitor. A different kind of boost circuit is shown in U.S. Pat. No. 5,001,400, which teaches use of a high-frequency-driven inductive-discharge "forward converter" to reduce power line current harmonic distortion.

Recently, to obtain circuit simplicity while still minimizing power line harmonics, connections have been proposed directly from the high frequency circuit to a node between the power line rectifier and an isolating diode through which all current to the energy storage capacitor flows.

U.S. Pat. No. 4,782,268 shows one such circuit. Circuit behavior is not easily described mathematically, but can be described qualitatively as follows: A relatively steady high voltage is maintained on main storage capacitor C4, and is converted into a high frequency square wave by an inverter formed by transistors T1 and T2. This high-frequency square wave is applied from a node M1 to the lamp circuit and to a coupling capacitor C7 which is connected to a node M2 between two diodes. These diodes are in series between the rectifier bridge and the storage capacitor C4, and are polarized in the direction of current flow from the rectifier bridge to the capacitor C4.

During a portion of the high-frequency cycle at node M1, the voltage at node M2 falls below the rectified power line voltage, and current flows from the bridge rectifier and input capacitor C2 through the diode D4 to coupling capacitor C7. Isolating diode D5 is a fast recovery diode which prevents current backflow from the main storage capacitor C4. During another portion of the high-frequency cycle at M1, the voltage at M2 rises above the voltage on the storage capacitor C4, and current flows from capacitor C7 through diode D5 to charge capacitor C4. When the power line voltage is near its peak, a large pulse of current is drawn through diodes D4 and D5, fully charging capacitor C4, as shown in FIGS. 4a and 4b. of the '268 patent. During this period there can be no significant high frequency current flow through capacitor C2.

A further capacitor C8, whose value is substantially smaller than C7, provides coupling from node M2 to the lamp circuit. The value of this capacitor is chosen to make the line current more sinusoidal.

This high-frequency charging circuit provides a great improvement over conventional capacitor-input filters, but still does not reduce line harmonics or lamp crest factor sufficiently. For example, to flatten the current spike shown in FIG. 4a, the patent teaches use of a relatively large 0.6H line choke L2, producing the current waveform of FIG. 4b. To minimize harmonic line currents, operation at 25 to 50 kHz is suggested.

Still more recently, published PCT application WO 92/04808 discloses a ballast circuit for a compact fluorescent lamp which has an isolating diode similar to that in the '268 patent, but a different feedback connection. The lamp current circuit itself is connected between the inverter output and the node between the power line rectifier and the isolating diode. A capacitor C3, having a value about 0.047 $\mu$f, causes line current to be drawn during those portions of the input rectified voltage waveform when the rectified voltage is less than the voltage across the main storage capacitor. However, as shown in FIG. 4, the line current has a substantial spike near the peak of the voltage, when line current is being drawn directly as charging current for the main storage capacitor, so that line current still has an undesirably high harmonic content. The inverter is self-triggering, so there is no particular control of the inverter frequency.

Showing a different approach to control of electronic ballasts, U.S. Pat. No. 4,682,082 describes a circuit especially adapted for driving a neon lamp, in which the on and off periods of one of the transistors are controlled to be different. This invention minimizes a problem encountered with high frequency operation: the production of striations or bubbles in the gas plasma within the lamp.

When a main storage capacitor is placed directly across the output of a power line bridge rectifier, the value of this capacitor is a compromise. A very high capacitance produces a fairly low voltage ripple between charging pulses, but these pulses are sharp and generate very large line harmonic currents. A smaller capacitance reduces these harmonics, but the ripple voltage causes the lamp crest factor to become excessive.

As taught in U.S. Pat No. 3,611,021, it was recognized at least as early as 1970 that the lamp current of an electronic-ballasted fluorescent lamp could be stabilized by sensing the lamp current, and varying the frequency of a ballast inverter in a direction to reduce the lamp current variation. In this circuit, the operating frequency is below the starting frequency, and frequency is reduced in order to decrease lamp current.

Lamp current variation can be particularly severe when a high frequency ballast is used with a high pressure gas discharge lamp. U.S. Pat. No. 4,471,269 teaches use of a relatively small ($\leq 1$ μf) storage capacitor, so that the high frequency lamp current would vary widely over the course of one half cycle of the power line voltage. To correct for this, the inverter switching frequency is modulated by comparing the instantaneous line current with the instantaneous line voltage, and using the difference signal to control the frequency of the inverter. The inverter frequency is raised to a peak when the line voltage is at its peak, and the inverter frequency is at its minimum when the line voltage is near crossover. Thus frequency is varied in direct proportion to rectifier output voltage.

U.S. Pat. No. 4,862,040 teaches use of a complex circuit and structure for modulating the inverter frequency of a fluorescent lamp ballast, to compensate for variations in lamp current which would result from ripple voltage on the storage capacitor. The inverter's output has a frequency averaging about 30 kHz. A complex saturable transformer varies the inverter frequency as a function of the instantaneous magnitude of the DC supply voltage to the inverter. Starting with an unmodulated frequency of about 25 kHz, for a ±30% ripple voltage the frequency averages about 30 kHz. This correction circuit raises the inverter frequency when the line voltage, and the DC bus voltage, are at their peak.

U.S. Pat. No. 4,873,471 teaches yet another technique for reducing the harmonic content of line current and the lamp crest factor. This relatively complex circuit does not contain a main energy storage capacitor. Rather, during approximately ⅔ of each half-cycle of power line frequency, the rectified sinusoid voltage is applied to the inverter circuit. The inverter frequency is varied approximately linearly with the voltage supplied to the inverter (high frequency at the high point of the line voltage), so that the lamp current remains approximately constant. During this same time, a make-up power source, containing a relatively large secondary storage capacitor, is charged from a bridge rectifier driven from a secondary winding on the inverter transformer. During the "inter-cusp period" of the rectified line voltage, the inverter draws power from the secondary storage capacitor, which has such a value that its voltage drops little during this period; and the inverter frequency remains relatively constant at its minimum value.

SUMMARY OF THE INVENTION

According to the invention, in an electronic lamp ballast circuit having a high frequency section providing lamp current, a lower frequency power input section, and a circuit coupling between the high frequency section and the power input section for drawing high frequency current pulses (pulses at a repetition rate related to the high frequency) from the power input section, a control loop senses a parameter which varies over the course of a cycle of the lower frequency, and frequency modulates the frequency of the lamp current during each cycle of the lower frequency power input in a manner which minimizes the lamp crest factor without introducing non-sinusoidal components in the line current. The load on the input power rectifier appears resistive when charging current is transferred by a frequency-sensitive coupling, at a high pulse rate synchronized to the high frequency, from the rectifier output to a storage element which supplies power to the high frequency source during part of each high frequency cycle. Circuit values are selected such that, during normal operation, power never flows directly from the rectified input to the storage element.

In a preferred embodiment, an electronic lamp ballast includes a high frequency inverter connected to a storage capacitor which is isolated from the bridge rectifier. A resonant circuit, supplying current to the lamp, is coupled from the inverter to a circuit point between the storage capacitor and the output of a full-wave bridge rectifier supplied from the low frequency (60 Hz) input. A capacitor in the resonant circuit alternately receives power from the bridge rectifier and delivers power to the storage capacitor at the high frequency rate. The inverter frequency is varied during the course of each half cycle of the low frequency input, responsive to a varying parameter such as the modulation envelope of current through the lamp circuit, to minimize the lamp crest factor.

A low-cost electronic ballast for use with fluorescent lamps has a half-bridge transistor inverter connected across the storage capacitor, and a series-tuned resonant circuit connected to the inverter junction for supplying lamp current. The aforementioned capacitor in the resonant circuit has a first terminal connected to one terminal of the storage capacitor, and a second terminal connected to an energy transfer node. An isolating diode is connected between the energy transfer node and the other terminal of the storage capacitor. The energy transfer node is connected, indirectly or directly, to the bridge rectifier, for transfer of power from the bridge rectifier in high frequency pulses.

The half-bridge inverter is operated at a modulated frequency above the resonant frequency of the series-tuned circuit. Unlike prior art electronic ballasts, with fixed inverter frequency the peak of the envelope of lamp current has been found to occur at the instant of line voltage crossover, rather than at the peak of the line voltage. The inverter is controlled from a voltage-controlled oscillator whose output frequency is varied according to a function of the instantaneous value of the modulation envelope of current through the lamp circuit; preferably, the frequency rises approximately linearly with the sensed current, over a range of approximately 10 to 40% of the lowest frequency, but in some cases with even a greater swing. This then produces a highest inverter frequency at the time of line voltage crossover, yet the one control connection can correct for both lamp crest factor and long term changes of as much as ±10% in the line voltage.

DESCRIPTION OF THE PREFERRED EMBODIMENT

Figure 1:
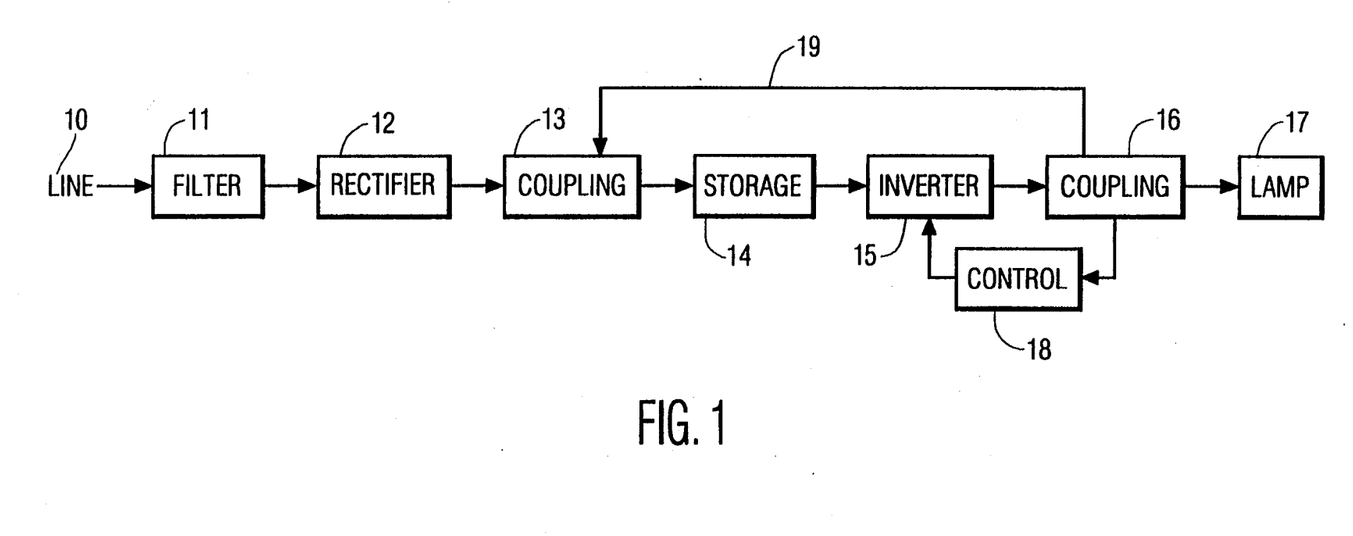
FIG. 1 is a block diagram of an electronic ballast according to the invention.

As shown in FIG. 1, a practical electronic ballast circuit according to the invention is formed from a small number of basic circuits, each individually being well-known or easily devised by one of ordinary skill in the art. Power input is from a standard low frequency AC line 10, such as 120 v, 60 Hz. A filter 11 prevents conduction of high frequency and RF noise into the line 10. A rectifier 12 is typically formed as a full-wave bridge rectifier, whose output is rectified half-sine-wave pulses. The rectifier output is coupled by a coupling circuit 13, typically consisting of one or two diodes, to an energy storage element 14, such as an electrolytic capacitor, across which a relatively high DC voltage is maintained. As described below, during normal operation the voltage across this storage capacitor is greater than the peak voltage appearing at the output of the rectifier 12.

A high frequency generator 15 changes the DC from the storage device 14 to a high frequency voltage having a frequency typically between 20 and 75 kHz. A resonance coupling circuit 16, connected to the generator 15, is arranged to be resonant at a frequency somewhat lower than the normal range of the high frequency voltage. A fluorescent lamp 17 is connected to or across a part of the coupling circuit 16. A control circuit 18, which is preferably formed at least in part by an integrated circuit, senses voltages or currents at one or more places in the coupling circuit 16, and provides control signals for the generator 15.

A feedback connection 19 from the coupling circuit 16 to the coupling circuit 13 causes current to be drawn from the rectifier/filter 12/11 combination during part of every cycle of the high frequency. Charging current flows to storage device 14 during at least one different part of each cycle of the high frequency. Throughout all of every cycle of the line input, stored energy in the device 14 is higher than that which would be obtained by normal charging from the rectifier 12.

In accordance with the invention, the circuit values and operating frequency range are selected such that the current from the input power line has a waveform substantially the same as the line voltage waveform, and the control circuit 18 senses a parameter which varies over the course of each line voltage cycle, and modulates the frequency of generator 15 over the same period in such a way as to maintain the high frequency current through the lamp substantially constant. This directly reduces the lamp crest factor. At the same time, the deviation of frequency, from a nominal value which minimizes line current harmonics, need not be so great nor continued for so long (that is, only a portion of a line half cycle), that line current is distorted excessively.

Figure 2:
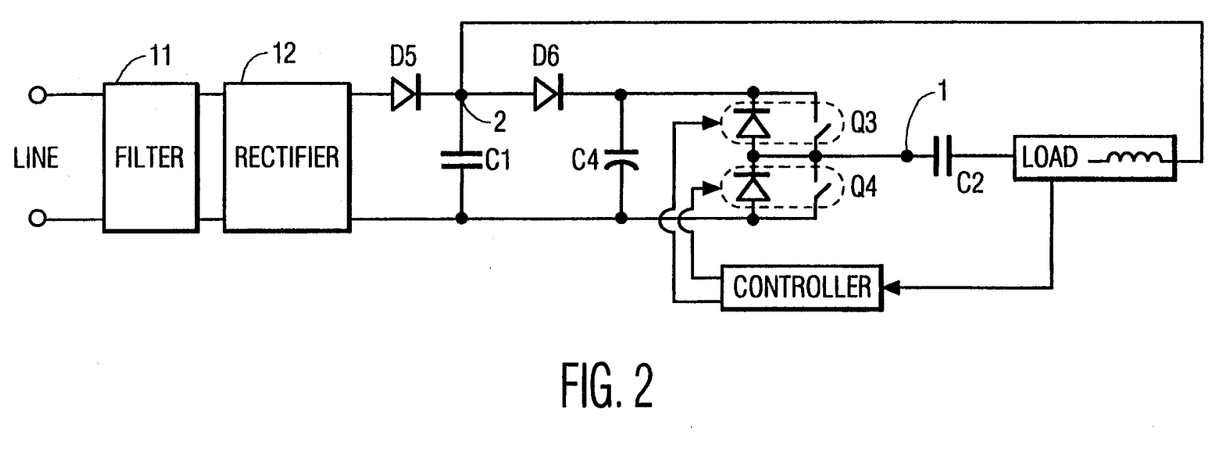
FIG. 2 is a simplified schematic diagram of a first ballast circuit according to FIG. 1.
Figure 3:
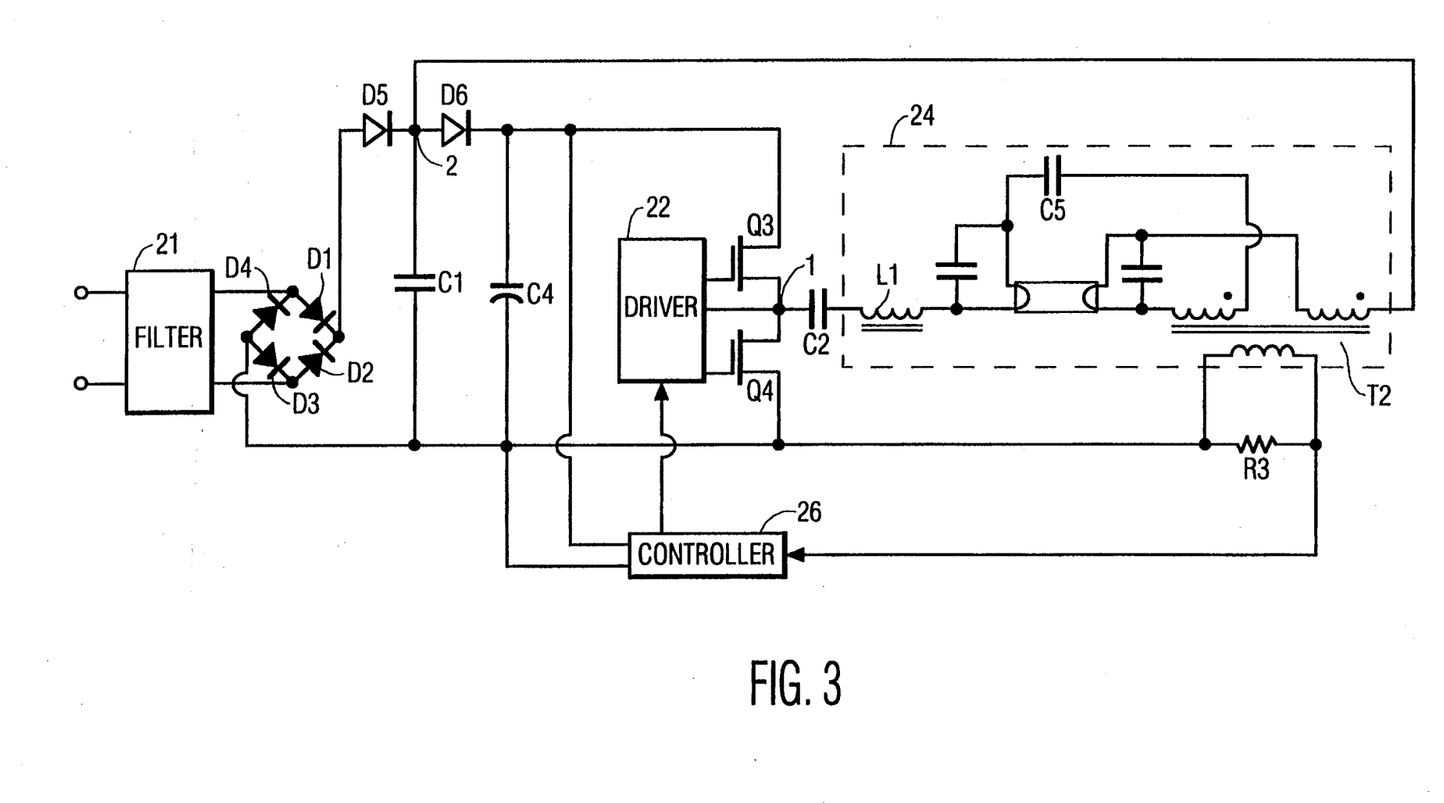
FIG. 3 is a more detailed schematic diagram of the circuit of FIG. 2.

One embodiment of the invention is shown in FIGS. 2 and 3, in which corresponding circuit elements have the same identification. This circuit is intended for use with a 240 VAC, 50 Hz input line, for a lamp ballast in Europe. An EMI filter 21 is connected between the input line terminals and a full-wave bridge rectifier formed by diodes D1–D4. A fast recovery diode D5 is connected between the bridge rectifier positive terminal and a junction 2 to which lamp current flows. A fast recovery isolating diode D6, poled in the same direction, is connected between the junction and a storage capacitor C4. Transistors Q3 and Q3 are connected in series across capacitor C4, to form a half-bridge inverter having an inverter output junction 1. The inverter is driven by a conventional circuit 22.

In this circuit, the lamp current is directly fed from the inverter junction 1, through a coupling capacitor C2 and a coupling network 24, to the junction 2. During those portions of each high frequency cycle when neither diodes D5 nor D6 are conducting, all the lamp current then flows through a low-value capacitor C1. A signal proportional to the instantaneous lamp current is obtained from a current transformer T2, across whose output winding a low-value resistor R3 is connected. Switching of the inverter is controlled by a conventional integrated circuit controller 26.

The lamp coupling circuit 24 contains a choke L1 and a starting capacitor C5. An exemplary circuit of the embodiment of FIG. 3 has the values given below. In this circuit the capacitor C5 has a sufficient capacitance, in comparison with C1, that it has an appreciable effect on the resonant frequency, and current, during normal operation. This is an effect which is fully understood, and easily computed, by those of ordinary skill in the electronic ballast art. For simplicity, however, the following discussions of circuit operation do not refer separately to the effect of C5.

| | |
|---|---|
| C1 | 15 nf |
| C2 | 330 nf |
| C4 | 56 μf |
| C5 | 15 nf |
| L1 | 1.7 mh |
| R3 | 2.4 Ω |

At a line voltage of 230 v, this circuit was operated with an inverter frequency varying between 39 and 54 kHz over the course of each half cycle of the line voltage, the frequency being a maximum at line voltage crossover. Total harmonic distortion in the line current was 9%, and lamp crest factor was 1.4. Over the range of 207 volts to 264 volts, line current harmonic content remained under 15% except near the low end of the range.

Figure 4:
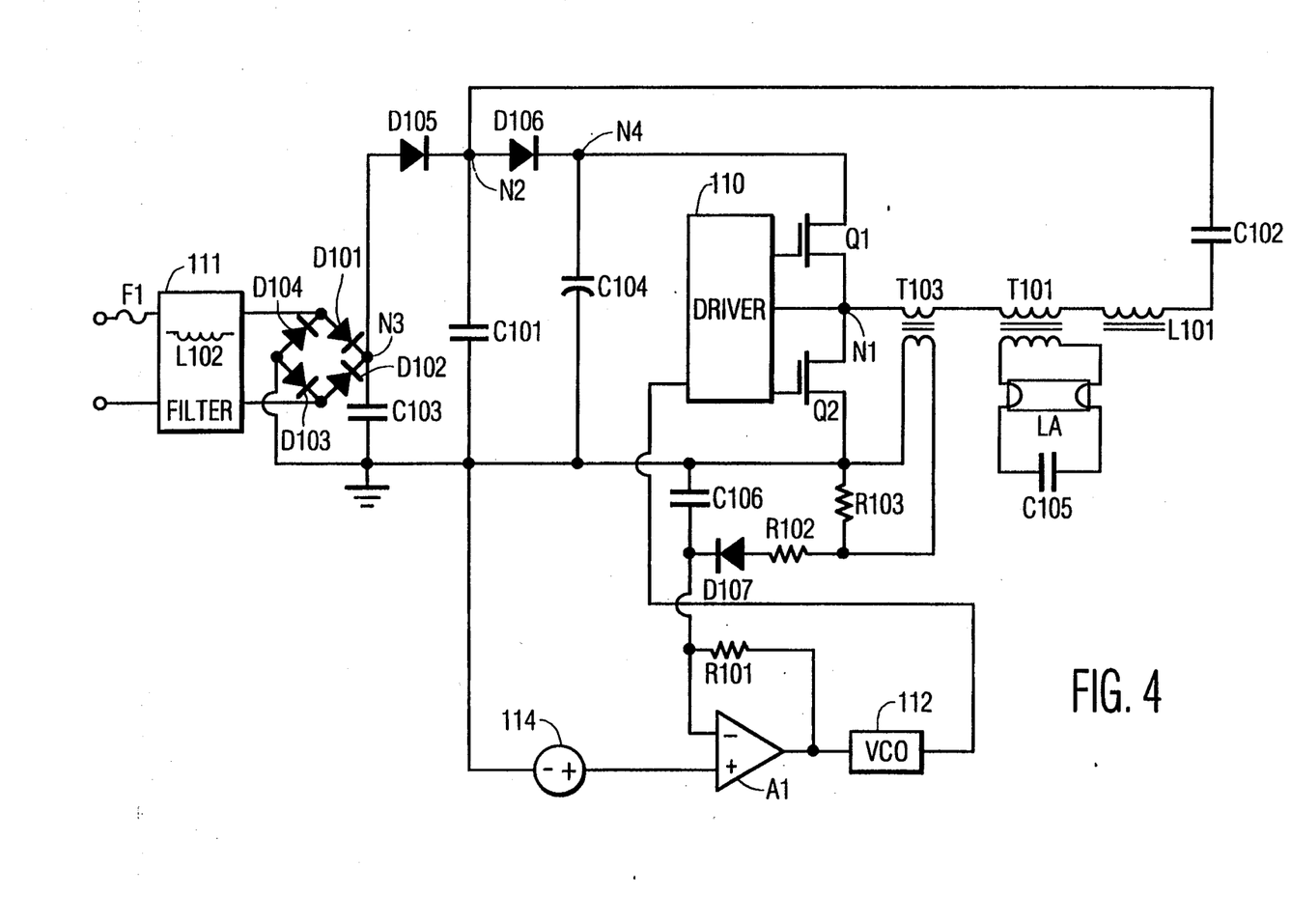
FIG. 4 is a simplified schematic of another ballast circuit according to FIG. 1.
Figure 5:
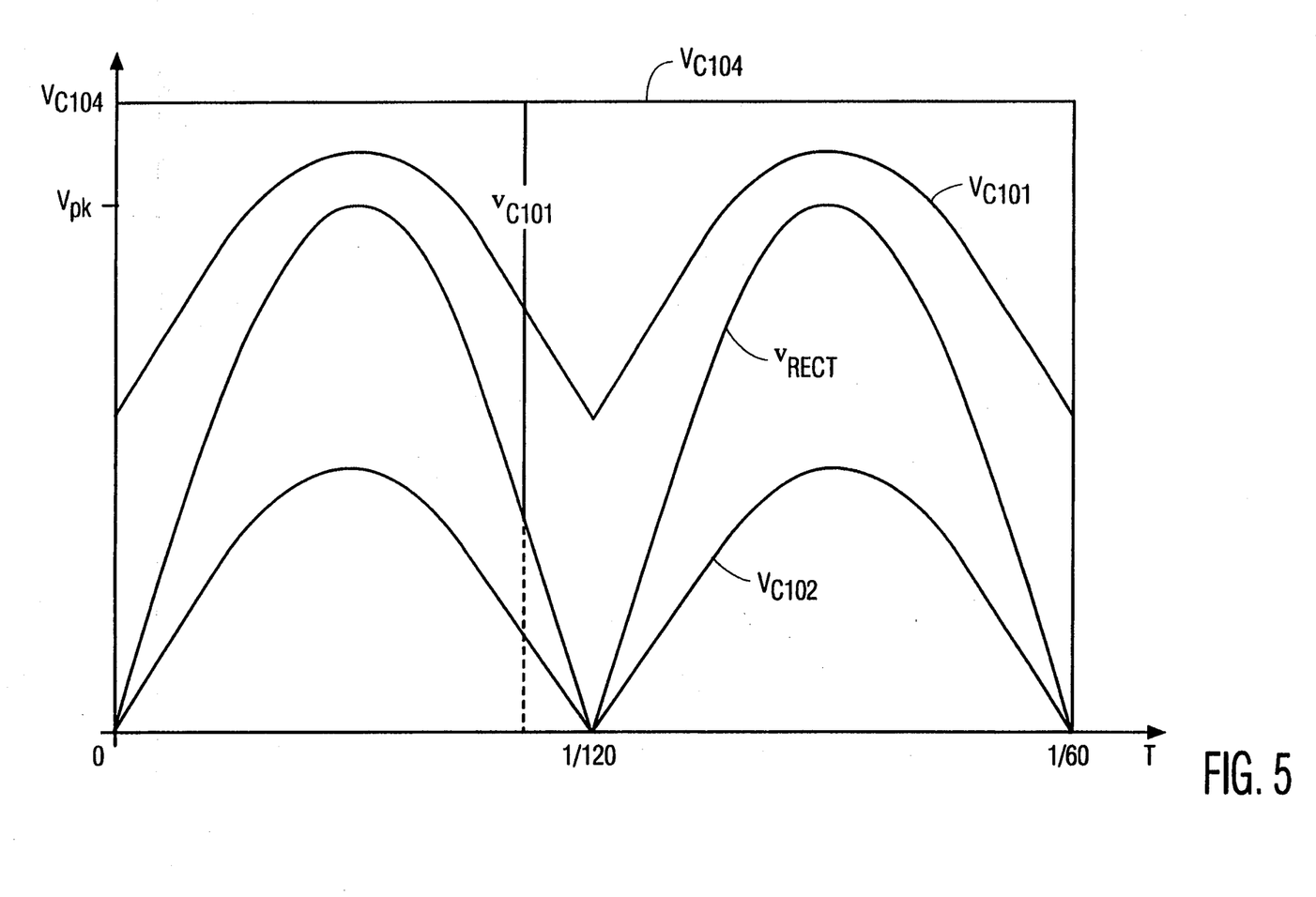
FIG. 5 is a graph showing variation of certain voltages over one input power line cycle.

A preferred embodiment of the invention for use with conventional fluorescent lamp luminaries having removable lamps, and supplied with power according to U.S. standards, is shown in FIG. 4. A fluorescent lamp LA is energized from a high frequency half-bridge inverter formed by two transistors Q1 and Q2. The primary of a load transformer T101 and a current transformer T103 are connected in series between the output node N1 of the inverter and a series resonant circuit formed by a choke L101 and a tuning capacitor C101. The tuning capacitor C101 is connected between a node N2 in the power input section of the ballast, and the ground connection. A coupling capacitor C102 is connected in this series circuit, between the choke L101 and node N2.

The source of power for the ballast is a 120 V, 60 Hz input AC line. The input line is connected to a conventional bridge rectifier D101–D104 through a fuse F1 and an interference filter 111 including line chokes L102 and a capacitor C103. The bridge rectifier negative output is connected to the circuit ground, and the positive output defines a node N3 having voltage $V_{RECT}$ and is connected through a fast recovery diode D105 to the node N2. A second fast recovery diode D106 is connected between the node N2 and a node N4, which is the high voltage supply point for the inverter transistor Q1. A storage capacitor C104 is connected across the inverter power input, between node N4 and the circuit ground. The diodes D105 and D106, and the coupling from the tuned high frequency circuit to them, act together to provide energy transfer from the input line to the capacitor C104 at a high frequency rate, and produce an elevated DC input to the inverter as will be explained below.

The fluorescent lamp load is connected across the secondary of the transformer T101, and a conventional starting capacitor C105 is also connected to the lamp filaments.

The inverter is controlled by a driver circuit 110, which in turn is controlled by a high frequency signal from a voltage controlled oscillator 112 whose frequency is determined by the output of a differential amplifier A1. The amplifier A1 has its positive input connected to a reference voltage source 114, and has a feedback resistor R101 connected from its output to its negative input. The negative input is also connected to a rectifier and RC filter formed by diode D107, resistor R102 and capacitor C106 which rectify and filter the high frequency components of the lamp current, leaving the rectified current modulation envelope which varies at the frequency of the bridge rectifier output (120 times per second). This current-sensing signal is obtained from a low value resistor R103 across the secondary of current transformer T102.

Operation

The circuits of FIGS. 3 and 4 operate in the manner described below with respect to FIG. 4, although powered from different AC line voltages and frequencies, with different lamp loads, and at different inverter frequencies. This is accomplished by adjusting the component values, as will be clear to those of ordinary skill in the electronic ballast art.

The inverter formed by transistors Q1 and Q2 is normally operated at a frequency above the effective resonant frequency of the resonance circuit with a 50% duty cycle for each transistor. During start-up, the frequency is swept downward toward the resonant frequency, as is well known. After the lamp has started, the high frequency current through the inductor L101 (also the primary of transformer T101), causes the voltage $v_{C101}$ at node N2 to rise and fall, once each cycle of lamp current, between limits shown in FIG. 6 related to the action of the diodes D105 and D106. The voltage $V_{C101}$ is the average voltage across C101 during an entire high frequency cycle; this varies as shown over the course of one line voltage cycle. The voltage $V_{C102}$ across the coupling capacitor varies little during the course of one high frequency cycle, but varies over the course of a line voltage cycle between half the peak line voltage $V_{pk}$, when the line is at its peak, and approximately zero when the line is near zero.

Circuit behavior follows the cyclical pattern now to be described, except that, when the line voltage is near a zero crossing, there may be a difference in the instant in the high frequency cycle when the inductor current reaches its peak, and the period of time when charging current flows to capacitor C4 is delayed. For simplicity, the effect of C105 is ignored; it does not change the general way in which the circuit operates, but only affects precise values of current and voltage.

During a first stage of each high frequency cycle, immediately after transistor Q1 has switched on, because of the substantial inductance of inductor L101 current will still be flowing in a direction from node N2 to node N1. Q2 being switched off, current during this stage will flow in the "backwards" direction, through the reverse current diode which forms part of Q1, through C104 in a direction to charge C104, through the bridge rectifier and input power line (or filter), diode D105 and coupling capacitor C102. The inductor current now falls rapidly.

A certain period of time after transistor Q1 has been turned on, current through the inductor L101 reverses as the circuit enters the second stage of the high frequency cycle. The voltage at node N2 (which had been held by diode D105 at the then-existing instantaneous value of the rectified line voltage $V_{RECT}$) then starts to rise as capacitor C101 is charged. Capacitor C104 is now discharging through transistor Q1, and inductor L101 current rises at a rate determined by the voltage $V_{C102}$ across coupling capacitor C102 (which changes little during one high frequency cycle), the instantaneous difference in voltage ($V_{C104}-v_{C101}$) between the capacitors C101 and C104, the inductance L101 and the effective resistance of the lamp. After the node N2 voltage reaches the sum of the voltage $V_{C104}$ across the storage capacitor C104 plus the diode drop of D106, the circuit enters its third stage. The node 2 voltage remains constant, and no current flows through capacitor C104. Driven solely by the voltage across coupling capacitor C102, the still rising inductor current flows through diode D106.

In a fourth stage, immediately after the inverter switches, Q2 being on and Q1 off, the voltage driving the tank circuit is reversed because the voltage across capacitor C101 exceeds that across C102. Current is still flowing through diode D106, and will flow through capacitor C104 in a charging direction, but at a rapidly falling rate. When the lamp current reverses, the circuit enters the fifth stage. Diode D106 will cut off, and the voltage across C101 will start falling toward the then-existing rectified power line voltage. The reverse current will increase with a waveform similar to the previous positive current increase. No current flows through capacitor C104.

When $v_{C101}$ reaches the rectified line voltage less the forward drop of diode D105, the sixth stage is reached, and $v_{C101}$ remains constant. The inductor current then flows through transistor Q2, the bridge rectifier and the line or line filter, and through diode D105 and coupling capacitor C102. Immediately after the inverter again switches, and Q2 is turned off, this current will start to fall sharply as it flows through Q1, in a charging direction through C104, and through the bridge rectifier and diode D105, thus repeating stage 1 as described above.

The six different stages of one high frequency cycle are only partly symmetrical. The storage capacitor C104 receives charging current during the first and fourth stages, immediately following each switching of the inverter, but discharges only during stage two, when the voltage across capacitor C101 is being raised from the value where diode D105 was conducting to the value where diode D6 conducts. A current pulse is drawn from the AC line during stages 1 and 6.

As described above, the voltage $V_{C102}$ across capacitor C102 equals the difference between the average voltage $V_{C104}/2$ at node N1 and the average voltage $V_{C101}$ over the course of one high frequency cycle. $V_{C101}$ and $V_{C102}$ change greatly over the course of one half cycle of the power line voltage, and so does the magnitude of the excursion of the voltage $v_{C101}$ across capacitor C101 during a high frequency cycle, but $V_{C101}$ and $V_{C102}$ change in a direction opposite to the magnitude change. When the line voltage $V_{RECT}$ (and correspondingly $V_{C102}$) are quite low, shortly before the instant of inverter switching the voltage across the inductor and the effective load resistance may be so low that current through the inductor starts falling before the inverter switches. D105 conduction is delayed. This is consistent with the desire that line current waveform be identical to line voltage waveform. At the instant of line voltage crossover, the voltage $v_{C101}$ should reach its low limit (diode D105 is about to conduct) just as inductor current reaches zero.

When the component values and inverter frequency have been properly selected, the envelope (connected average) of the current pulses through diode D105 match the rectifier output voltage waveform. Except for the high frequency pulsation which is filtered by the interference filter, to the rectifier the ballast load looks like a pure resistance. Analysis shows that this requires that the value of storage capacitor C104 be sufficiently high that $C_{C104}$ does not change appreciably over the course of a line voltage cycle. It would seem that this should also cause the lamp current crest factor to be a minimum, but the reverse is actually true. Both the waveform and the magnitude of inductor current change, in a complex fashion, as the rectifier output voltage changes over the course of one input voltage cycle. As a result, with a ballast operated as described so far, lamp crest factor will typically exceed 1.7.

With a constant inverter frequency at the exact value which makes the ballast look resistive, the current modulation envelope through the lamp circuit never approaches zero, because capacitor C101 is charged and discharged between the power line rectifier output value $V_{RECT}$ and the voltage $V_{C104}$ across capacitor C104 once each high frequency cycle. The unexpected result is that the component of lamp current due to current through C101 (that is, current flowing during the second and fifth stages described) is maximum when the line voltage is zero, and minimum when the line voltage is at its peak. At the same time, the envelope of current through diode D105, at 120 Hz, is the same shape as the rectified line voltage.

Applicants have discovered that, in a ballast constructed and operated otherwise as above, by modulating the inverter frequency with a frequency excursion generally proportional to the load current modulation, the lamp current can be maintained essentially constant with no significant effect on line current harmonics. To achieve this result, it is necessary that the storage capacitor have sufficient capacitance that its voltage does not vary appreciably during one cycle of line voltage, and that the value of C101 be small enough that current flows through diode D105 only in response to the high frequency current.

In the preferred embodiment, the filter R102/C106 provides a signal to the amplifier A1 which causes the inverter frequency to vary linearly with the load current modulation envelope. Maximum frequency, and lamp current, occur at the time of line voltage crossover.

In general, to achieve this desired result, $C102>>C101$; $C104>>C102$; and $|Z_o|>|Z_{LA}|$, where $|Z_o|=\sqrt{(L101/C101)}$ and $|Z_{LA}|$ is the effective lamp impedance reflected to the primary side of transformer T101.

An exemplary circuit of the embodiment of FIG. 4 used the following component values:

| | |
|---|---|
| C1 | 47 nf |
| C2 | 330 nf |
| C3 | 470 nf |
| C4 | 87 μf |
| C5 | 4.7 nf |
| L1 | 0.15 mh |
| L2 | 800 μh |
| $|Z_{LA}|$ 23 Ω | |

The above analysis was all based on the assumption that operation would be essentially linear. Thus, for a given input power voltage, the circuit values are correct to provide the desired power to a given load with a nominal input line voltage.

If the load is linear, and its power were permitted to vary according to the square of the input voltage level (inverter frequency having the same average value over the course of a line cycle, although being modulated during each 60 Hz line cycle), a standard tolerance of ±10% on the line voltage will not affect line harmonics or load current crest factor. When, according to accepted practice, the ballast control circuit compensates for changes in line voltage, this compensation may cause the harmonic distortion of the line current to be greater than could otherwise be obtained because the average frequency, over one input voltage cycle, is different from that frequency which causes the load on the rectifier to look resistive. However, the overall performance of the lighting system is optimized by a compromise involving lamp life and efficiency, ballast cost, and line current waveform.

For example, the circuit of FIG. 4 may operate between a minimum frequency of about 56 kHz and a maximum frequency of about 80 to 85 kHz. This circuit can also be modified in that the reference voltage for the amplifier A1 is varied in response to a change in the average value of the AC line voltage, such as by using a predetermined fraction of the voltage across the storage capacitor as a reference.

Alternatively, the sensing of lamp current may provide all the correction necessary for changes due both to the load current variation inherent in the circuit connection to capacitor C101 and to variation in the average value of the power line voltage.

To achieve dimming of a fluorescent lamp load, or other control purposes, it may be desirable to vary the duty cycle of the switching transistors from the 50/50 % cycle referred to above, in addition to the inverter frequency modulation, while at the same time keeping lamp crest factor and line current distortion within acceptable limits.

It will be clear to those of ordinary skill in the art that many variations of ballast circuits are possible, in accordance with the spirit of the invention. For example, although it may appear more cumbersome with 1993 technology, it may be possible to use a different form of frequency generator, such as an inverter using a transformer with a center-tapped primary, and switching transistors in the classical push-pull configuration, so long as the load seen by the rectifier can be made to look resistive. Some other form of oscillator may become desirable. Coupling from the high frequency section to the low frequency section may be through other types of circuit element or sub-circuit. Many forms of resonance circuit are used for coupling the lamp to the high frequency source. An entirely new form of coupling circuit may be devised, in which the lamp frequency is different from that of the high frequency generator; but keeping the effect that lamp current is influenced by the frequency of the high frequency generator.

What is claimed is:

1. An electronic power supply for a load, comprising:
   a high-frequency section providing alternating current to said load at said high-frequency,
   a power input section receiving input power at a low frequency, and having a pulsating DC output, and
   a circuit coupling between the high frequency section and the pulsating DC output for drawing current pulses from the power input section,
   characterized in that said power input section provides power only as a series of said current pulses at a repetition rate synchronized to said high frequency, arranged to minimize current distortion in the low frequency input power, and
   said power supply further comprises means for sensing a parameter which varies during each cycle of said low frequency to provide a sensed signal, and
   control means, responsive to said sensed signal, for frequency modulating said high frequency of the load current during each cycle of the low frequency power input to minimize low frequency modulation of the load current without significant increase in distortion of the current drawn by said power input section.

2. An electronic ballast for a discharge lamp, comprising:
   a high frequency section providing alternating lamp current to said lamp at said high frequency,
   a power input section receiving input power at a low frequency, and having a pulsating DC output,
   a circuit coupling between the high frequency section and the pulsating DC output for drawing current pulses from the power input section,
   characterized in that said power input section provides power only as a series of said current pulses at a repetition rate synchronized to said high frequency, arranged to minimize current distortion in the low frequency input power, and
   said ballast further comprises means for sensing a parameter which varies during each cycle of said low frequency to provide a sensed signal, and
   control means, responsive to said sensed signal, for frequency modulating said high frequency of the lamp current during each cycle of the low frequency power input to minimize low frequency modulation of the lamp current without significant increase in distortion of the current drawn by said power input section.

3. A ballast as claimed in claim 2, characterized in that said high frequency section includes an energy storage element; and current is drawn from said power input section, and current is delivered to said energy storage element, only at mutually different periods of time in each high frequency cycle.

4. A ballast as claimed in claim 3, wherein the high frequency section comprises a resonance circuit for coupling to the lamp, characterized in that said means for sensing senses a signal from said resonance circuit.

5. A ballast as claimed in claim 3, wherein the high frequency section comprises a resonance circuit for coupling to the lamp, characterized in that said means for sensing senses the lamp current.

6. A ballast as claimed in claim 5, characterized in that said high frequency has a maximum value approximately at the voltage crossover of said low frequency.

7. A ballast as claimed in claim 2, wherein the high frequency section comprises a resonance circuit for coupling to the lamp, characterized in that said means for sensing senses a signal from said resonance circuit.

8. A ballast as claimed in claim 2, wherein the high frequency section comprises a resonance circuit for coupling to the lamp, characterized in that said means for sensing senses the lamp current.

9. A ballast as claimed in claim 8, characterized in that said high frequency has a maximum value approximately at the voltage crossover of said low frequency.

10. An electronic lamp ballast, comprising
    input means for connecting to a source of low-frequency AC power,
    a full-wave rectifier circuit connected to said input means for providing a pulsating full-wave rectified supply voltage at a supply voltage output,
    an energy-storage capacitor connected to said supply voltage output through an isolating diode,
    an inverter circuit connected to said energy-storage capacitor for providing high-frequency power at an inverter frequency,
    a resonance circuit comprising at least one inductance and one capacitor, and
    means for connecting at least one electrical discharge lamp to said resonance circuit and to said inverter circuit to operate said lamp with alternating current at said inverter frequency,
    characterized in that said means for connecting comprises a component connected to said isolating diode for supplying current pulsations to said energy-storage capacitor only at a pulse repetition rate synchronized to said inverter frequency, and
    the ballast further comprises:
    means for sensing a parameter which varies during each half cycle of said low frequency to provide a sensed signal, and
    control means, responsive to said sensed signal, for frequency modulating the inverter frequency during each half cycle of the low frequency power input to minimize variation in the lamp current without significantly increasing distortion of the low frequency current drawn by said power input section.

11. A ballast as claimed in claim 10, characterized in that current is drawn from said supply voltage output, and current is delivered to said energy storage capacitor, only at mutually different periods of time in each high frequency cycle.

12. A ballast as claimed in claim 11, characterized in that said means for sensing senses a signal from said resonance circuit.

13. A ballast as claimed in claim 12, characterized in that said component is said capacitor in the resonance circuit.

14. A ballast as claimed in claim 11, characterized in that said means for sensing senses the lamp current.

15. A ballast as claimed in claim 14, characterized in that said high frequency is a maximum approximately at the voltage crossover of said low frequency AC power.

16. A ballast as claimed in claim 10, characterized in that said means for sensing senses a signal from said resonance circuit.

17. A ballast as claimed in claim 16, characterized in that said component is said capacitor in the resonance circuit.

18. A ballast as claimed in claim 10, characterized in that said means for sensing senses the lamp current.

19. A ballast as claimed in claim 18, characterized in that said high frequency is a maximum approximately at the voltage crossover of said low frequency AC power.

20. A method of providing high power factor current from a first-frequency alternating voltage source, comprising:
providing a power input rectifier section receiving input power at said first frequency from said source, having an output whose waveform is substantially the full-wave rectified equivalent of the waveform of said alternating voltage source,
providing a high frequency section operating at a second frequency which is substantially higher than said first frequency, for delivering alternating current to a load at said second frequency, and
providing a circuit coupling between the high frequency section and said output for drawing current pulses from said power input section,
characterized by selecting values for said circuit such that said circuit and high frequency section present an equivalent resistive impedance to said output, and
drawing current from said output only as a first series of said current pulses at a repetition rate synchronized to said second frequency.

21. A method as claimed in claim 20, wherein said high frequency section includes a storage capacitor and a high frequency inverter whose input is connected across said storage capacitor, said high frequency inverter operating at said second frequency, and said storage capacitor having a capacitance sufficiently great that voltage across said capacitor does not change substantially during a half cycle of the first frequency alternating voltage,
characterized by providing charging current to said storage capacitor as a second series of current pulses flowing only at times different from pulses of said first series, the voltage across said storage capacitor being greater than said output during each entire cycle of said first frequency alternating voltage.

22. A method as claimed in claim 21, characterized by:
sensing a parameter which varies during each cycle of said first frequency, and
frequency modulating said second frequency to minimize modulation of the load current at a frequency related to said first frequency without significant increase in distortion of the current drawn by said power input section.

23. A method as claimed in claim 22, characterized in that said sensing step includes sensing said load current to provide a current signal, and low-pass filtering said current signal.

24. A method as claimed in claim 23, wherein said load is a gas discharge lamp, characterized by connecting said lamp in effective series combination with an inductance and a capacitance to form said circuit.

25. A method as claimed in claim 20, characterized by:
sensing a parameter which varies during each cycle of said first frequency, and
frequency modulating said second frequency to minimize modulation of the load current at a frequency related to said first frequency without significant increase in distortion of the current drawn by said power input section.

26. A method as claimed in claim 25, characterized in that said sensing step includes sensing said load current to provide a current signal, and low-pass filtering said current signal.

27. A method as claimed in claim 26, wherein said load is a gas discharge lamp, characterized by connecting said lamp in effective series combination with an inductance and a capacitance to form said circuit.

28. A method as claimed in claim 25, wherein said load is a gas discharge lamp, characterized by connecting said lamp in effective series combination with an inductance and a capacitance to form said circuit.

29. A method as claimed in claim 20, wherein said load is a gas discharge lamp, characterized by connecting said lamp in effective series combination with an inductance and a capacitance to form said circuit.

30. An electronic power supply for a load, comprising:
a power input section receiving input power at a low frequency, and having a pulsating DC output,
a high frequency section providing alternating current to said load at said high frequency, said high frequency being substantially higher than said low frequency, and
a circuit coupling between the high frequency section and the pulsating DC output for drawing current pulses from the power input section,
characterized in that said power input section provides power only as a first series of said current pulses at a repetition rate synchronized to said high frequency, arranged to minimize current distortion in the low frequency input power, and
said high frequency section comprises an energy storage element for storing energy over a period at least equal to one half cycle of said low frequency, and means for providing charging current to said storage element as a second series of second current pulses at a second repetition rate synchronized to said high frequency.

31. A supply as claimed in claim 30, characterized in that said energy storage element is a capacitor which has a capacitance sufficiently great that voltage across said capacitor does not change substantially during said half cycle of said low frequency, and which is charged to a voltage greater than the peak value of said pulsating DC output, and
said second current pulses flow only at times different from the pulses of said first series of said current pulses.

32. A supply as claimed in claim 31, characterized in that said high frequency section comprises an inverter for providing said alternating current to said load, and said inverter has power input connections connected across said capacitor.

33. A supply as claimed in claim 31, characterized in that said circuit coupling between the high frequency section and the pulsating DC output includes a further capacitor which is also part of the high frequency section, and said high frequency section comprises a diode having one terminal connected to said further capacitor and a second terminal connected to the energy storage capacitor.

* * * * *